US010853864B1

(12) United States Patent
Kotas et al.

(10) Patent No.: US 10,853,864 B1
(45) Date of Patent: *Dec. 1, 2020

(54) PROVIDING BRAND INFORMATION VIA AN OFFERING SERVICE

(71) Applicant: Amazon Technologies, Inc., Seattle, WA (US)

(72) Inventors: Paul A. Kotas, Seattle, WA (US); James F. Lu, Seattle, WA (US); Jason A. Galep, Seattle, WA (US); Christopher Duane Furniss, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 389 days.

This patent is subject to a terminal disclaimer.

(21) Appl. No.: 15/817,078

(22) Filed: Nov. 17, 2017

Related U.S. Application Data

(63) Continuation of application No. 13/567,832, filed on Aug. 6, 2012, now Pat. No. 9,875,497.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0625* (2013.01); *G06Q 30/0257* (2013.01); *G06Q 30/0641* (2013.01); *G06Q 30/06* (2013.01)

(58) Field of Classification Search
CPC .............................................. G06Q 30/00–08
See application file for complete search history.

(56) References Cited

U.S. PATENT DOCUMENTS

| 9,875,497 | B1 * | 1/2018 | Kotas ................. G06Q 30/0625 |
|---|---|---|---|
| 2007/0156654 | A1 * | 7/2007 | Ravinarayanan ..... G06F 16/951 |
| 2010/0281029 | A1 | 11/2010 | Parikh et al. |
| 2013/0085823 | A1 | 4/2013 | Gibson et al. |
| 2013/0104063 | A1 | 4/2013 | Legris |
| 2013/0198204 | A1 | 8/2013 | Williams et al. |
| 2014/0244443 | A1 | 8/2014 | Steelberg et al. |

OTHER PUBLICATIONS

Visual and Textual Appeals in Banner Advertising: A Content Analysis. Louis Perez. The Rochester Institute of Technology. UMI No. 1501449. Jul. 22, 2011; Retrieved via ProQuest (Year: 2011).*
Office action for U.S. Appl. No. 13/567,832, dated Oct. 5, 2016, Kotas et al., "Providing Brand Information via an Offering Service", 15 pages.

(Continued)

*Primary Examiner* — Michael Misiaszek
(74) *Attorney, Agent, or Firm* — Lee & Hayes, P.C.

(57) ABSTRACT

Described herein are techniques for providing information regarding brands of items offered for acquisition by an offering service. The items may comprise tangible or intangible goods, products (e.g., electronics, sporting goods, digital music, etc.), services, or the like. A brand, meanwhile, may refer to a name, term, design, symbol, or any other feature that distinguishes a designer, maker, manufacturer, seller or the like from other entities.

20 Claims, 10 Drawing Sheets

(56) References Cited

OTHER PUBLICATIONS

Office Action for U.S. Appl. No. 13/567,832, dated Dec. 2, 2014, Paul A. Kotas, "Providing Brand Information via an Offering Service", 20 pages.
Office action for U.S. Appl. No. 13/567,832, dated Dec. 31, 2015, Kotas, "Providing Brand Information via an Offering Service", 9 pages.
Office action for U.S. Appl. No. 13/567,832, dated May 18, 2017, Kotas et al., "Providing Brand Information via an Offering Service", 7 pages.
Thorbjornsen, et. al., "The impact of brand loyalty on website usage", Journal of Brand Management; Feb. 2004; 11,3. p. 199. Retrieved via ProQuest on Aug. 9, 2017.
"USAtoday.com Unveils State-of-the-Art Ad Campaign to Promote Microsoft Windows XP Launch" PR Newswire; New York, Oct. 24, 2001. Retrieved via Proquest on Aug. 9, 2017.

* cited by examiner

PROVIDING BRAND INFORMATION VIA AN OFFERING SERVICE

CROSS-REFERENCE TO RELATED APPLICATIONS

This application is a continuation of and claims priority to U.S. patent application Ser. No. 13/567,832, filed on Aug. 6, 2012, the contents of which are incorporated by reference herein in their entirety.

BACKGROUND

As electronic devices become a greater part of daily life, the amount of transactions conducted electronically continues to rise. For instance, users now regularly shop for digital and physical items from their desktop computers and, more and more, from their mobile electronic devices (e.g., mobile phones, tablets, etc.). As the amount of electronic transactions continues to increase, enhancing the experience of users engaging in these transactions remains a priority.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 5 illustrates an example home page of the offering service. In this example, the home page includes posts provided by representatives of brands that the illustrated user has previously expressed an interest in.

DETAILED DESCRIPTION

Overview

Figure 1:
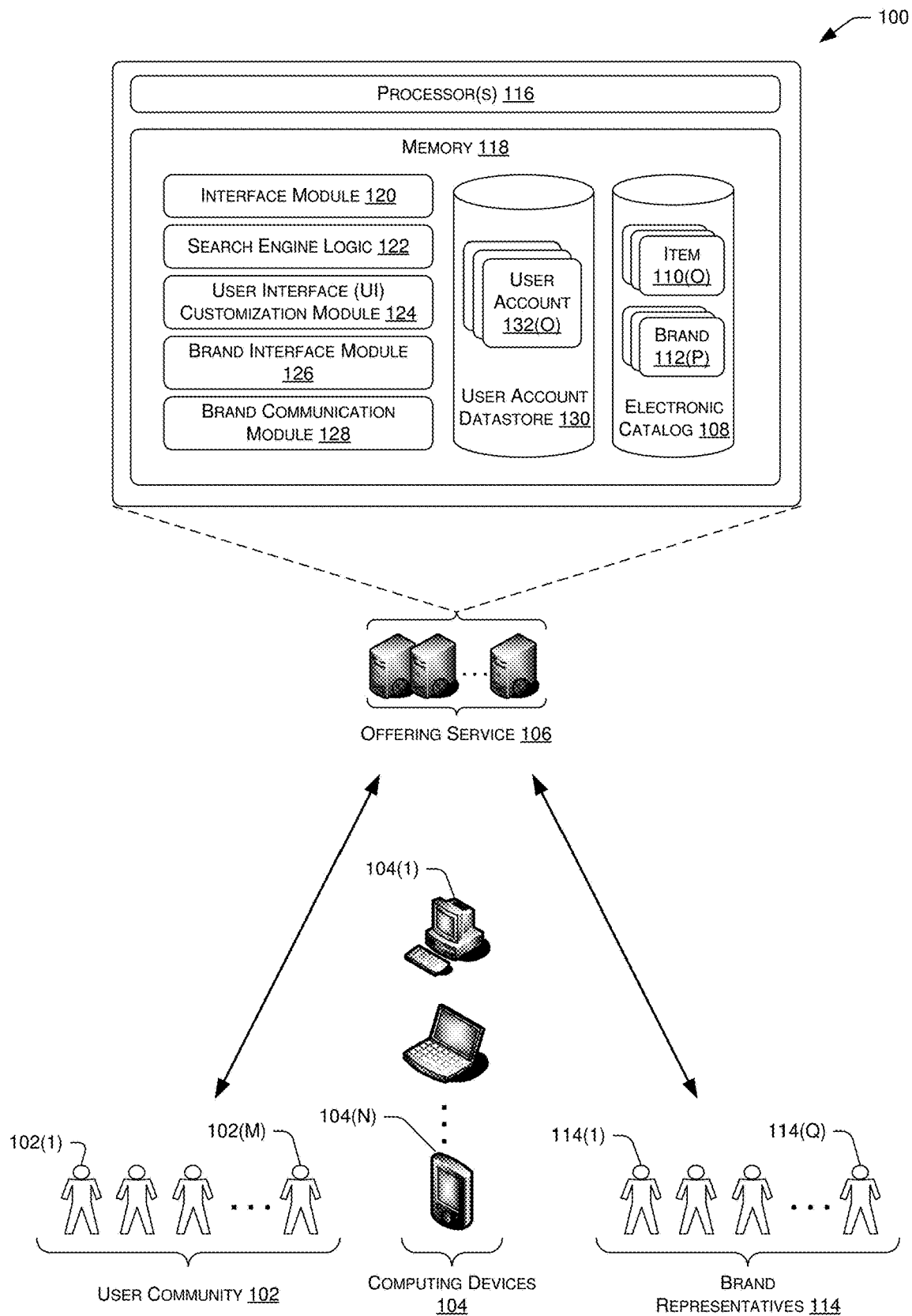
FIG. 1 illustrates an example architecture in which an offering service maintains an electronic catalog of items available for acquisition by users of a user community. In addition, the offering service receives information from representatives of brands of items in the electronic catalog, and provides this information to users of the user community in addition to providing information about individual items.

This disclosure is directed, in part, to techniques for providing information regarding brands of items, including brands that offer items for acquisition by an offering service and brands that do not. The items may comprise tangible or intangible goods, products (e.g., electronics, sporting goods, digital music, etc.), services, or the like. A brand, meanwhile, may refer to a name, term, design, symbol, or any other feature that distinguishes a designer, maker, manufacturer, seller or the like from other entities. For instance, a particular pair of jeans may be associated with a particular brand, such as "Levi's", and potentially with multiple different brands (e.g., "Levi's" and "Levi's 501"). Furthermore, while the following document describes the techniques as applied to brands, it is to be appreciated that these techniques may apply to other entities or groupings as well, such as authors, artists, fictional characters, item categories, and the like.

As described below, an offering service may offer multiple different items for acquisition by users of a user community. In some instances, the offering service comprises an electronic marketplace that is accessible over a network by client computing devices. Users may therefore utilize these computing devices to interact with the offering service and, potentially, acquire (e.g., purchase, lease, rent, download, etc.) items from an electronic catalog maintained by the offering service. In some instances, the offering service itself supplies the items, while in other instances the offering service lists items supplied by other providers. In still other instances, the offering service implements a combination thereof. As such, the users may utilize client computing devices to request and receive user interfaces (UIs) associated with particular items offered by the service. The devices may receive and render the UIs, which may include details about the particular items, such as a cost of a particular item, a rating of the item, an availability of the item, and the like.

In addition, the offering service may maintain information associated with particular brands of items. As such, the offering service may create respective UIs that include details associated with particular brands. The service may serve these UIs to client computing devices to allow users of these devices to learn information about the particular brands. For instance, the offering service may maintain individual web pages associated with particular brands. These web pages (or other types of UIs) may include an array of information tailored to the respective brands. For instance, these UIs may include an image selected by a representative of the brand, a rating of the brand as determined by users of a user community, items associated with the brand and recommended for a particular user that requests the UI, best-selling items associated with brand, and the like. The UIs may also include multiple other pieces of information, such as information indicating which brands other previous users have viewed before or after visiting the particular brand UI, a tool to allow users to vote on which of multiple brands the users prefer, and the like.

The UIs may additionally or alternatively include any other sort of information pertaining to the brands. For instance, the UIs may indicate which terms (e.g., adjectives) most frequently appear in customer reviews, top-selling brands, top-trending brands, brand-focused UIs (or "brand stores") that a user has recently viewed, search queries that users most frequently use before requesting to receive a UI about the particular brand, what brand(s) people with a similar browse and/or purchase history as the particular user have viewed or otherwise shopped for, items that users that shop a particular brand often purchase or otherwise acquire, customers that "like" a certain brand also "like" these other brands ("brand similarities") and the like. The UIs may also include an icon (e.g., entitled "Like") that allows a user to express an interest in the brand, may include free-form or fixed-answer questions regarding the brand, and the like. With use of these UIs, users of the offering service are able to shop or otherwise learn more information about particular brands of items, rather than simply learning about items on an individual basis.

Furthermore, users may access the brand-focused UIs described below in a multitude of ways. For instance, users may navigate to these UIs from a search results page, from selection of an advertisement (e.g., a mobile advertisement, an advertisement on a third-party site, etc.), from an item detail page, or from any other similar or different location. In some instances, each textual instance of a particular brand (e.g., "Levis") on the offering service may include a link to a brand-focused UI associated with the particular brand.

In addition, the offering service may allow authorized representatives of the brands to communicate to users via the offering service. These communications may announce new items from the brand, promotions, events, or any other type of information. In some instances, representatives of the brands may provide "posts" or other communications that may be serviced at the offering service or may be pushed or otherwise provided to users of the user community outside of the offering service. For instance, the offering service may display these posts on the UIs associated with the individual brands (discussed immediately above), on a home page of the offering service, on checkout pages of the offering service, on item detail pages associated with individual items (e.g., items of the corresponding brand), and anywhere on the offering service. Additionally or alternatively, when a brand representative creates a post, the post may be shared on one or more other platforms other than the offering service, such as social networking sites, micro-blogging sites, and the like. Further, users may receive these posts on any device associated with the offering service (e.g., on a user's personal computer, electronic book reader, mobile phone, tablet computing device, etc.).

In addition, these posts may be provided to users that express an interest in the particular brands. For instance, if a user expresses an interest in a particular brand (e.g., by selecting a "Like" icon on a UI dedicated that particular brand), then a representative of the brand, the offering service, or another entity may provide posts to the user (e.g., via email, text messaging, etc.). In some instances, the users may define the forum at which to receive the posts, how often to receive the posts (e.g., in real time, daily, etc.), and the like.

In some instances, individual posts may be associated with an icon that allows a user to express an interest in the individual post. In some instances, the brand may provide an incentive to users to express an interest in an individual post. For instance, the brand (or the offering service) may offer 10% off of a particular item for users that express an interest (e.g., that "like") a particular post. Of course, while one example has been provided, it is to be appreciated that any other incentive/reward may be utilized.

In addition to allowing brand representatives to provide these communications, the offering service may allow users and other entities to communicate in this manner. For instance, the offering service may include a text box that allows a user to type in a message for consumption by an array of users. After typing the message, the user may choose to share the message (e.g., by selecting a "Share" icon). This message may be posted to a particular page (or other UI) associated with a brand, may be sent to users that express an interest in a particular brand, may be sent to "friends" of the user on a social network (at the offering service or otherwise), or the like. Furthermore, users may choose to share posts by other entities, such as by sharing a post from a particular brand with friends of the user.

The offering services described herein may implement any sort of business model regarding the UIs described below. For instance, the offering service may charge a brand when users view a particular UI associated with a brand, a post of the brand, or the like. The offering services may implement a cost-per-impression model, a cost-per-click model, or the like.

These and other techniques are described below with reference to the example architecture of FIG. 1. Of course, while one example architecture is illustrated, these techniques may apply in multiple other architectures and environments.

Example Architecture

FIG. 1 illustrates an example architecture 100 in which users 102(1), . . . , 102(M) of a user community 102 operate respective client computing devices 104(1), . . . , 104(N) to access an offering service 106. The offering service may include one or more electronic catalogs 108 of items 110(1), . . . , 110(O) available for acquisition by the users 102. In addition, the electronic catalog(s) include information pertaining to one or more brands of items 112(1), . . . , 112(P). In some instances, the information about the items 110(1)-(O) and the information about the brands 112(1)-(P) may be stored in a common electronic catalog, while in other instances this information may be stored in different electronic catalogs. Furthermore, in some instances the electronic catalog(s) may include a catalog of advertisements that may be surfaced on the offering service or at other third-party locations. In some instances, these advertisements include links to the brand-focused UIs described below.

In addition, this architecture 100 includes one or more brand representatives 114(1), . . . , 114(Q) that provide information regarding the brands 112(1)-(P) to offering service, such as via computing devices 104. For instance, the brand representatives may be associated with different brands of items offered by the offering service 106 via the electronic catalog 108. As discussed above, a brand may refer to a name, term, design, symbol, or any other feature that distinguishes a designer, maker, manufacturer, seller or the like from other entities.

Within the architecture 100, users of the user community 102 may search for and acquire the items 110 from the offering service 106. Additionally, users of the user community 102 may request and receive information pertaining to the brands 112(1)-(P). The offering service may provide this information audibly for output on speakers of the client computing devices, via dedicated graphical user interfaces (GUIs) that are associated with respective brands, or in any other manner By providing information pertaining to the brands 112(1)-(P) in addition to information pertaining to the items 110(1)-(O), the offering service 106 allows users of the user community 102 to learn about the brands in addition to shopping for individual items.

The users 102 and/or the brand representatives 114 may utilize the computing devices 104 when accessing the offering service 106. These devices 104 may comprise any type of mobile electronic device (e.g., a mobile phone, a personal digital assistant (PDA), a laptop computer, etc.) or stationary electronic device (e.g., a desktop computer, server, kiosk, etc.). To interact with the offering service, the users 102 and/or the brand representatives 114 may utilize a browser, a downloaded application, or any other client application. The offering service, meanwhile, may comprise an e-commerce retailer, a brick-and-mortar merchant, a news site, a gaming platform, and/or any other entity that offers items (i.e., tangible and non-tangible goods) for acquisition by users of the user community 102.

Regardless of the application used to communicate between the computing devices 104 and the offering service 106, in some instances each entity described herein may communicate over one or more networks. These networks may include any one or combination of multiple different types of public or private networks (e.g., cable networks, the Internet, wireless networks, etc.).

As illustrated, the offering service may be hosted on one or more servers and may include one or more processors 116 and memory 118. The offering service may be available as a website, an intranet site, a downloaded client application, or in any other manner. The memory 118 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The memory 118 may store or otherwise have access to the electronic catalog 108 containing information about the items 110(1)-(O) offered for acquisition and the brands 112(1)-(P), as discussed above. The brands may or may not offer items for acquisition via the offering service 106. In addition, the memory 118 may store or otherwise have access to an interface module 120, search engine logic 122, a user interface (UI) customization module 124, a brand interface module 126, and a brand communication module 128. The memory 118 may also store a user account datastore 130, which includes individual records associated user accounts 132(1), . . . , 132(O), each of which is associated with a respective user of the user community 102. The user accounts 132(1)-(O) may store account information, such as a user's username at the offering service 106, one or more geographical locations associated with the user, contact information (e.g., email address, etc.) for the user, a purchase history of the user (at the offering service 106 or otherwise), a browse history of the user (at the offering service 106 or otherwise), one or more lists of items maintained by the user at the offering service 106 or at another service, preferences of the user, and/or an array of other characteristics associated with the user.

The interface module 120 functions to receive and respond to requests from the computing devices 104 operated by the users 102. For instance, the user 102(1) may operate a respective computing device 104(1) to request a UI associated with one or more particular items, one or more particular brands, or the like. In response, the interface module 120 may provide UIs (e.g., images, audio, video, etc.) back to the computing device 104(1) for output. These UIs may comprise item detail pages, pages associated with particular brands, search result pages, and the like.

The search engine logic 122, meanwhile, may receive search queries from users of the user community 102 and, in response, may identify search results associated with the search queries. The search results may include both items and brands from the electronic catalog, as illustrated and discussed in detail below. The interface module 120 may then form a search results page identifying the search results and provide the search results page back to the computing device 104(1). Of course, as described in detail below, information about the brands can be surfaced at any location and recommendations may be generated based on user searches, a user's browsing history, a user's purchase history, and/or the like.

The UI customization module 124 may customize UIs based on one or more factors, such as an identity of a user requesting a particular UI. For instance, when the user 102(1) requests to receive a home page of the offering service (e.g., by navigating to the URL associated with the home page), the module 124 may access, from the datastore 130, a user account associated with the user 102(1) to identify preferences, a browse history, a purchase history, or other information associated with past interactions between the user 102(1) and the offering service 106 and/or one or more other entities. The module 124 may then customize the UI for serving back to the computing device 104(1).

For instance, and as illustrated and discussed in detail below, when the user 102(1) requests the home page of the offering service, the module 124 may identify one or more brands that the user has previously expressed an interest in. The module 124 may then retrieve one or more posts from these brands and include these posts on the home page served back to the computing device 104(1). If the user 102(1) has not previously expressed an interest in any brand, then the module 124 may identify one or more other brands from other information from the user account (e.g., preferences, browse history, purchase history, etc.) for the purpose of identifying one or more posts from brands that the user may be interested in. The module 124 may also customize the home page in any other number of ways, such as by recommending items, brands, or the like.

The brand interface module 126, meanwhile, provides an interface for the brand representatives 114 to provide information to the offering service 106 regarding their respective brands 112(1)-(P). For instance, the brand representatives may utilize computing devices (e.g., the devices 104) to interact with the module 126 to provide information for inclusion on a page associated with a brand, examples of which are illustrated and described in detail below with reference to FIGS. 2 and 3. Additionally or alternatively, the brand representatives 114 may interact with the module 126 to provide posts for consumption by the users 102 on the offering service 106 or otherwise, examples of which are illustrated and described in detail below with reference to FIGS. 5 and 6. For instance, the brand representatives may utilize the module 126 to develop or modify a post, add tools or widgets to the UIs associated with their respective brands, otherwise modify the UIs, and the like.

Additionally or alternatively, the brand representatives may utilize the brand interface module 126 to acquire certain features for these UIs (e.g., premium features). For instance, the representatives may bid for keywords (either on or off of the offering service 106) such that their UIs appear on search results for queries that include those keywords, may acquire the ability to embed videos in the respective UIs, may convert (e.g., with a single selection) a post into an advertisement for storage in an advertisement database of the offering service, may acquire statistics and analytics regarding users' use of the respective UIs, and the like.

Finally, the brand communication module 128 functions to provide communications (e.g., "posts") to users of the user community 102 regarding brands that the respective users have expressed an interest in. The module 128 may also allow the users to share information regarding the brand(s) with other users, either via the offering service 106 or on other platforms. For instance, the brand communication module 128 may provide, to the user 102(1), posts provided by brand representatives of a brand that the user 102(1) has previously expressed an interest in. These posts may be provided on the offering service (e.g., on a home page, item detail pages, etc.), directly to a device of the user (e.g., via a text message, email, etc.), or in any other manner. In some instances, the user 102(1) may configure how, when, and where the user 102(1) would like to receive these posts. For instance, the user 102(1) may request to receive the posts in real time, may request that the module 128 aggregate the posts and provide them to the user 102(1) periodically (e.g., once a day), or the like.

While FIG. 1 illustrates several example components of the offering service 106, it is to be appreciated that the offering service 106 may include more or fewer components in other implementations. Furthermore, while FIG. 1 illustrates the offering service 106 as containing the illustrated modules, these modules and their corresponding functionality may be spread amongst multiple other actors.

Example User Interfaces (UIs)

Figure 2:
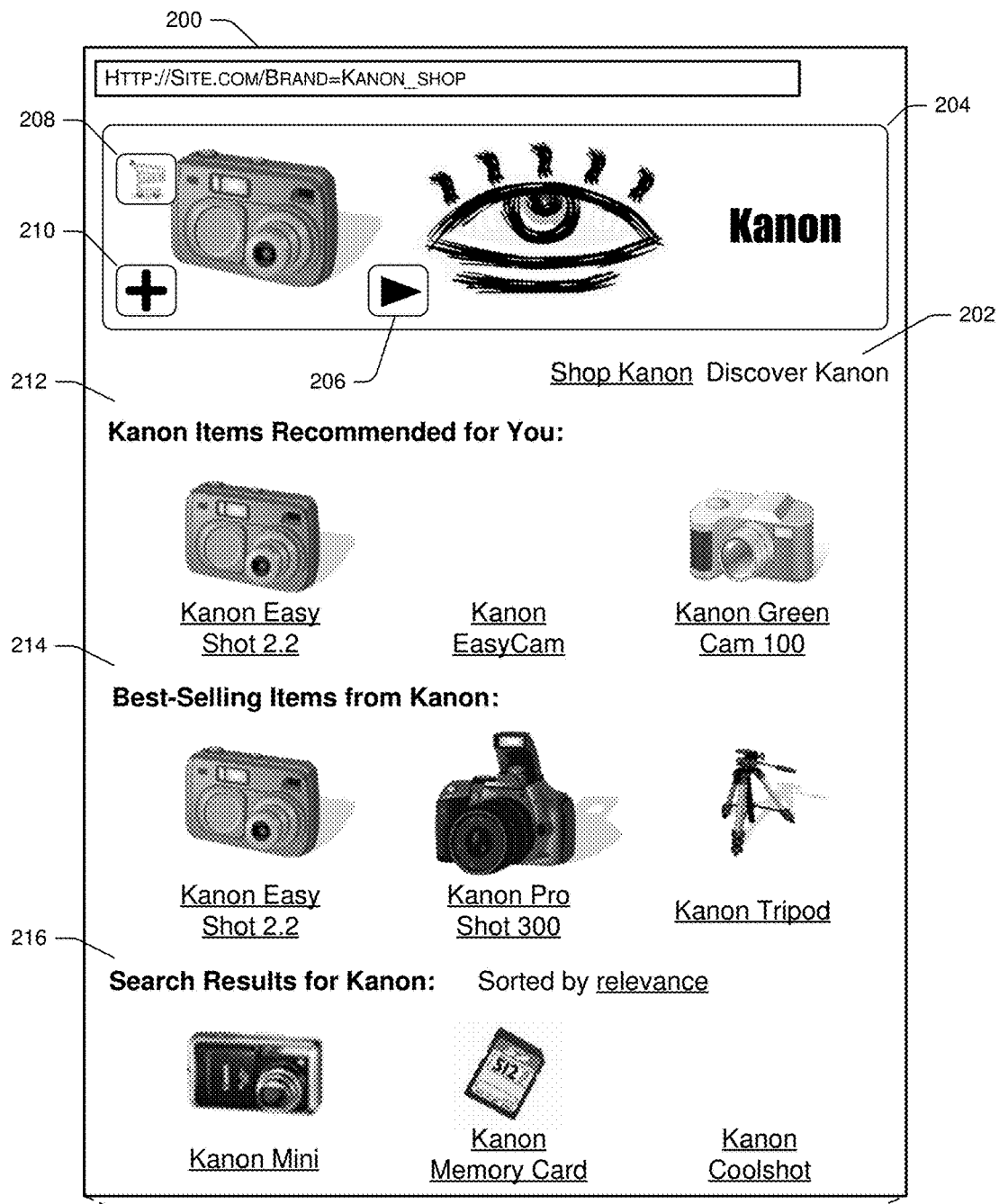
FIG. 2 illustrates an example user interface (UI) that the offering service may serve to a computing device of a user of the user community. As illustrated, the UI includes details pertaining to a particular brand of items offered at the offering service. In this example, the UI includes details of items associated with the brand that are recommended for the user, items that are the brand's best-selling items, and items that the offering service would surface in response to the user conducting a search for the example brand.
Figure 2:
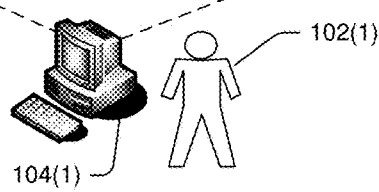

FIG. 2 illustrates an example user interface (UI) 200 that the offering service 106 may serve to the example computing device 104(1) of the user 102(1) of the user community 102. As illustrated, the UI 200 includes details pertaining to an example brand of items offered at the offering service (the fictional brand, "Kanon"). In other words, the UI 200 comprises a web page that is dedicated to a particular brand of items, as opposed to any one item offered by the brand. This UI 200 (in this instance, a web page) may include any sort of details regarding the brand, as discussed in detail below. Of course, while FIG. 2 (and the proceeding FIG. 3) illustrates example details, it is to be appreciated that other embodiments may implement UIs dedicated to brands that include any other similar or different pieces of information.

Figure 3:
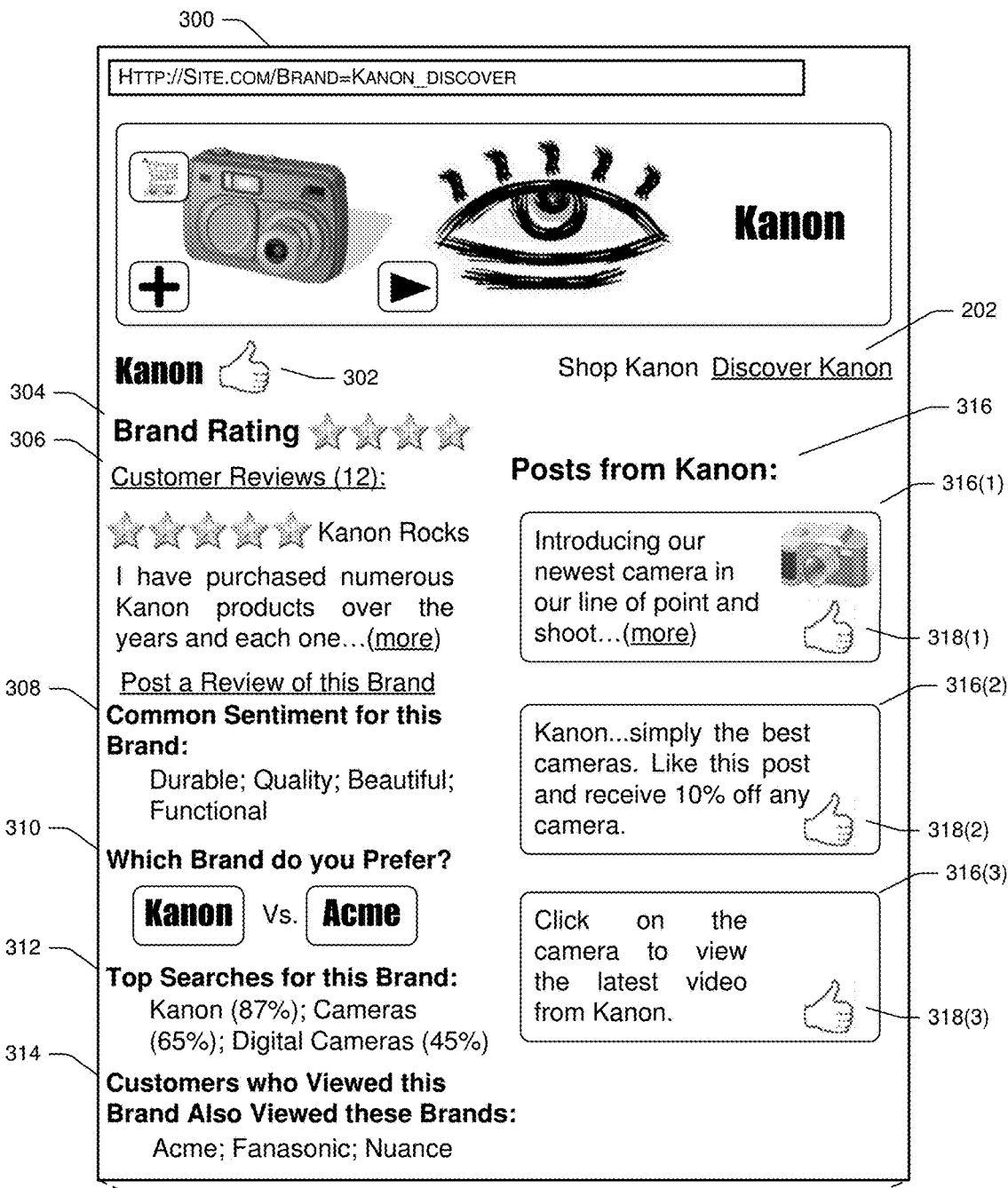
FIG. 3 illustrates another portion of the example UI of FIG. 2. This portion of the UI includes, in part, a rating of the brand as a whole, customer reviews of the brand, terms frequently used to describe the brand in the customer reviews, search terms frequently used to locate the brand, and posts provided by representatives of the brand.

In this illustrated example, the UI 200 is shown to include an option 202 to allow the user to either "Shop Kanon" or "Discover Kanon". Generally, the option to shop a brand (illustrated by UI 200) allows the user to view details associated with items offered by that brand, possibly in addition to other information. The option to discover a brand, meanwhile, may allow the user to learn more general information about the example brand. FIG. 3, discussed below, illustrates one example UI that the computing device 104(1) may render when the user 102(1) chooses to "Discover Kanon". The "shop" and "discover" views of the UI 200 could of course be presented in a unified view, which contains both "shop" and "discover" features.

As illustrated, the UI 200 may include a banner image 204 situated at a top portion of the UI 200. The banner image 204 may comprise any image that a representative of the example brand may select. In this example, the banner image 204 comprises a camera offered by the example brand, an image of an eye, and a name of the example brand ("Kanon"). In addition, the banner image 204 may include an icon 206 that, when selected, causes display of additional media, such as another image selected by the brand, a video selected by the brand, or the like. In this example, the icon 206 comprises a "play" icon that, when selected by the user 102(1), launches a video associated with the brand (e.g., an advertisement associated with the brand). The video may appear within the portion of the UI dedicated to the banner image 204, may appear in a new window atop the UI 200, may play on another device associated with the user 102(1), or may play at any other location.

The banner image 204 may also include an icon 208 that, when selected, causes the UI 200 to surface details associated with the item (or items) offered by the brand and illustrated in the banner image 204. For instance, selection of the icon 208 by the user 102(1) may cause the UI 200 to surface details associated with the illustrated camera, such as the name of the item, a rating of the item, a price of the item, and the like. In addition, the details may include an icon that allows the user 102(1) to add the item to a shopping cart of the user or directly purchase the item (e.g., via a one-click activation). In instances where the banner image 204 includes multiple items, the icon may surface details regarding the cost of acquiring the "bundle" of items. In some embodiments, selection of the icon 208 may directly result in the addition of the item or items to the shopping cart of the user 102(1) or may directly result in the purchase or acquisition of the item.

The banner image 204 may further include an icon 210 (e.g., in the shape of a plus sign). The brand representative may utilize this icon to display any sort of information the brand representative desires upon activation of the icon 210 by the example user 102(1). For instance, selection of the icon 210 by the user 102(1) may result in the banner image 204 being replaced with a different banner image selected by the brand representative, may result in display of general information about the brand, or the like.

In this example, the UI 200 further includes a list of items 212 that are offered by the brand and that are recommended for the user 102(1). For instance, when the user initially requested to receive the UI 200, the offering service 106 may have examined a user account associated with the user 102(1), as discussed above, to identify one or more items to recommend to the user 102(1) (e.g., based on the user's preferences, purchase history, browse history, etc.). In this example, the UI 200 recommends three cameras for the user 102(1).

The UI 200 may further include an indication of those items 214 that are the best-selling items of the particular brand. As illustrated, these best-selling items include two cameras and a tripod offered by the brand. The UI 200 may also include search results 216 that the offering service 106 would serve to the computing device 104(1) (or other computing devices) in response to the user running a search for the name of the brand, "Kanon". As illustrated, these search results are sorted by relevance to the example query. The offering service 106 may utilize any known or new algorithm for identifying search results associated with this example query.

In addition to the illustrated portions of the UI 200, the UI 200 may include features traditionally found in marketplace web pages. For instance, the UI 200 may include options to filter results illustrated on the page by cost, rating, features, or the like.

FIG. 3 illustrates another portion 300 of the example UI 200 of FIG. 2. The computing device 104(1) may surface this portion of the UI 300 (or simply "the UI 300") in response to the user 102(1) selecting the option to "Discover Kanon". Again, the UI 300 includes the banner image and the selectable icons discussed above. In addition, the UI 300 includes an icon that, when selected, allows the user 102(1) to express an interest (or "like") the example brand ("Kanon"). After selecting this icon 302, the offering service 106 may store an indication of this expression in the user account associated with the user 102(1). As discussed further below, choosing to express an interest in a brand may result in the user 102(1) receiving communications (or "posts") from this brand. In some instances, the UI 300 may also include an icon that is selectable to allow the user 102(1) to express disapproval of the brand (for an instance, an icon in the form a thumbs down).

As illustrated, the UI 300 further includes a rating 304 of the brand. The brand rating may be based on prior users' ratings of the actual brand itself, based on the prior users' ratings of items offered by the brand, or a combination thereof. While illustrated as a number of stars, it is to be appreciated that the brand rating may be expressed in any other manner.

The UI 300 may further include one or more customer reviews 306 of the brand. That is, rather than customer reviews of individual items offered by the brand, the customer reviews may be of the brand itself. The illustrated customer review, for instance, is entitled "Kanon Rocks" and includes a five-star rating of the brand. The UI 300 also includes a selectable link that allows the user 102(1) to "post a review for this brand". Of course, in other embodiments, the reviews may include reviews of items offered by the brand or combinations of reviews of the brand itself and reviews of items offered by the brand.

The UI 300 may also indicate customer sentiment 308 toward the brand.

For instance, the offering service 106 may mine the customer reviews associated with a particular brand to identify frequently used terms in the customer reviews, such as frequently used adjectives. In this example, the offering service 106 determines that the most frequently used adjectives in the customer reviews for the brand are "Durable", "Quality", "Beautiful", and "Functional".

Next, the UI 300 includes an area 310 to allow the user 102(1) to express a preference for one brand over another brand, each of which may be a competitor brand in a particular industry or sales space (e.g., digital cameras in this example). For instance, the area 310 includes two icons, one entitled "Kanon" and other entitled "Acme" (another fictional brand that makes or sells digital cameras). The area 310 also asks the user 102(1) which of the two brands the user prefers. The user 102(1) may therefore select one of the icons to indicate which of the two brands the user 102(1) prefers. The UI 300 may then surface results based on votes from other previous users. Furthermore, in some instances, the UI 300 may surface another icon associated with another brand in place of the non-selected brand, such that the user 102(1) may again voice a preference between the selected brand and the other new brand.

An area 312 of the UI 300 indicates terms that users frequently search on at the offering service 106 prior to requesting (i.e., navigating to) the UI 200 or 300. In this example, the area 312 indicates that 87% of the searches that lead to the UI 200/300 include the term "Kanon", 65% includes the term "Cameras", and 45% include the terms "Digital Cameras".

Next, an area 314 indicates which other brands that other users viewed either before or after viewing the example brand "Kanon". Here, for instance, the area 314 indicates that users that visited the UI 200 or 300 most often visited pages associated with the example brands "Acme", "Fanasonic", and "Nuance". In addition to the area 314, the UI 300 could include an area that indicates the brands users having similar browse histories, purchase histories, preferences or the like often visit in addition to visiting the brand "Kanon". Another area may also indicate particular item(s) that the user 102(1) may be interested in purchasing based on expressing an interest in the brand "Kanon".

At an area 316, the UI 300 includes examples posts 316(1), 316(2), and 316(3) from representatives of the brand. These posts 316 may include any sort of news about the brand or otherwise, and may include images, text, audio, video, games, and/or any other type of content. For instance, the post 316(1) includes news about a new point-and-shoot camera from "Kanon". The post 316(2), meanwhile, simply states that users that "like" (or express an interest) in the post 316(2) will receive 10% off of any camera offered by "Kanon". Finally, the post 316(3) includes a video that is viewable on the computing device 104(1) or another device in response to the user 102(1) selecting the post.

In addition to including news pertaining to the brand, each post includes an icon 318(1), 318(2), and 318(3), respectively, that allows the user 102(1) to express an interest (or "like") the individual post. For instance, if the user 102(1) selects the icon 318(2), the offering service 106 may store an indication of this selection and may apply a 10% discount if and when the user 102(1) purchases a Kanon camera via the offering service 106.

While a few example pieces of content have been shown, it is to be appreciated that the UI 300 may additionally or alternatively display an array of other content that may be configurable by the brand representative in a self-service manner. For instance, the UI 300 may indicate which items (e.g., cameras) are trending upwards and downwards based on sales, which items are the best-selling items of the example brand, what other items associated with other brands are best-selling items in the particular category associated with the UI 300, and the like. Furthermore, the UI 300 may include a customer service link or widget that allows the user 102(1) to interact with a representative of the example brand, either via email, live chat, voice chat, or the like.

Figure 4:
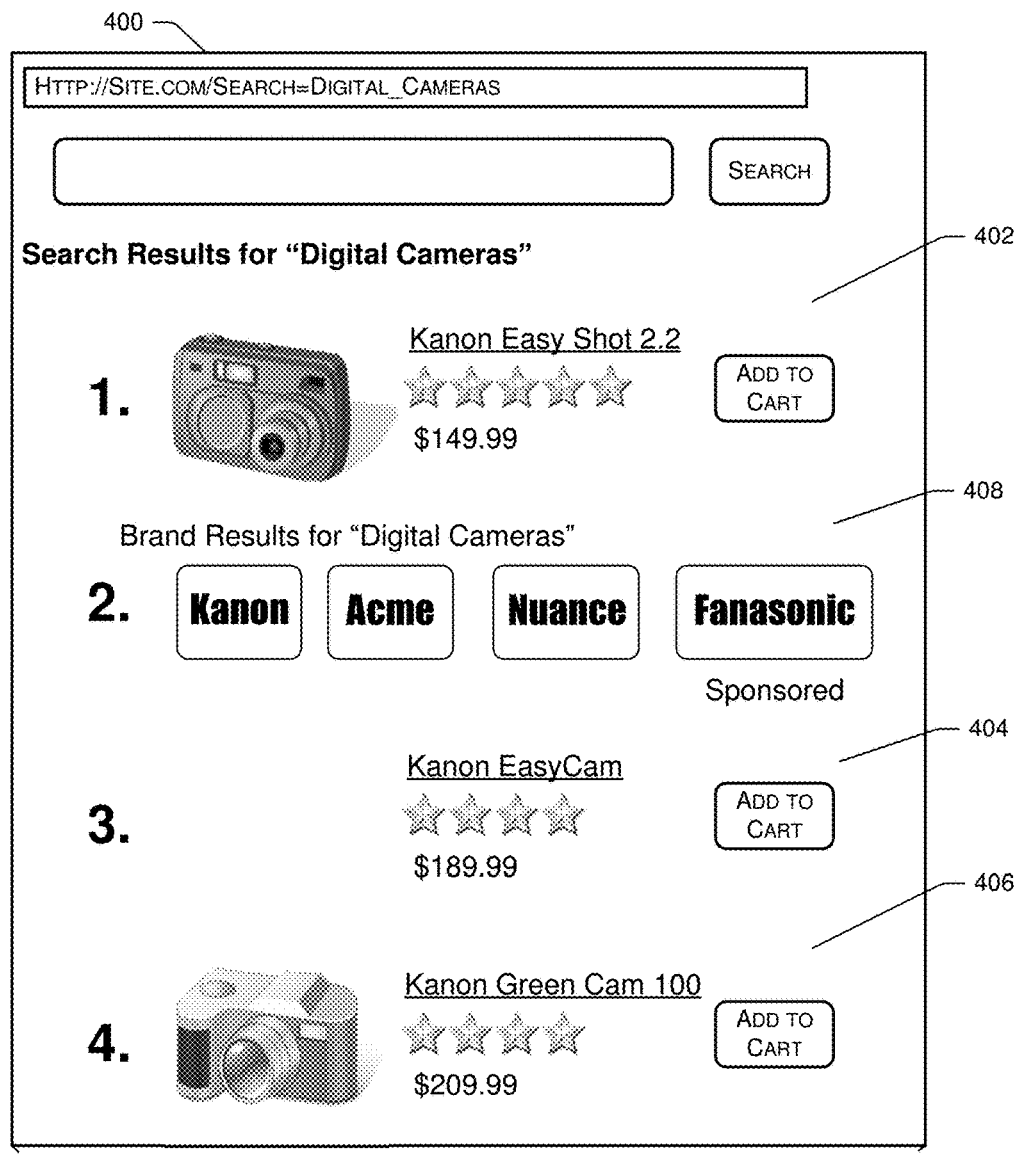
FIG. 4 illustrates an example search results UI that the offering service may serve to a computing device of a user in response to the user inputting the search query "digital cameras". As illustrated, the search results include items that are associated with the search query as well as brands that are associated with the search query.
Figure 4:
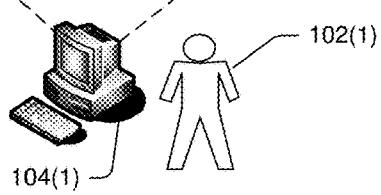

FIG. 4 illustrates an example search results UI 400 that the offering service 106 may serve to the computing device 104(1) of the user 102(1) in response to the user 102(1) inputting the search query "digital cameras". While the search query is illustrated textually, it is to be appreciated that the user 102(1) may input this query textually, audibly, via selection or input of an image, or in any other manner. As illustrated, the search results include details about items 402, 404, and 406 that are associated with the search query. The offering service may identify these items using any sort of traditional search logic. In addition, however, the search results UI 400 identifies one or more brands 408 that are associated with the search query. For instance, the offering service 106 may identify that these brands ("Kanon", "Acme", "Nuance", and "Fanasonic") are associated with or otherwise offer digital cameras for acquisition.

Within the UI 400, each of the icons associated with the four example brands may be selectable to navigate the computing device 104(1) to a page associated with the particular brand. For instance, selection of the icon associated with the brand "Kanon" may result in the offering service serving the UI 200 discussed above with reference to FIG. 2. Similarly, selection of another one of the icons associated with one of the other three brands may result in the offering service serving a UI associated with the selected brand.

Furthermore, the contents of the UI associated with the selected brand may be determined at least in part by the specificity of the search query. For instance, in the illustrated example the user 102(1) searches for results that are associated with "Digital Cameras". As such, when the user selects the icon associated with "Fanasonic", the offering service 106 may serve a UI that is not only associated with this brand, but that is focused on digital cameras offered by this brand (e.g., similar to the UI illustrated for "Kanon" in FIGS. 2 and 3). If however, the user 102(1) were to search for "DVD players" and the search results again included the brand "Fanasonic", selection of this icon would result in the offering service 106 serving a UI that is focused upon DVD players offered by "Fanasonic" rather than digital cameras. As such, the search query, the location of the offering service from which the user 102(1) requests a UI associated with a brand, and/or other factors may affect the contents of the brand-focused UI.

As illustrated, one or more of the brands included in the search results may be "sponsored" results, while the remaining brands may be deemed the most relevant brands associated with the search query. That is, in this example, the first three brands may be deemed strongly associated with the search query "digital cameras" (e.g., relevance ranking of the products that appear in the results because of ratings of these brands' cameras, sales of these brands' cameras, etc.), while the fourth ("Fanasonic") might not be as strongly associated. Nevertheless, this brand may purchase the ability to surface on the search results UI 400 associated with the search query "Digital Cameras". As such, this brand appears on the UI 400 and is indicated as a sponsored result.

Furthermore, while the UI 400 illustrates the brands together as a single search result and listed second in the search results UI 400, in other embodiments these brands may be situated at any other location on the UI. For instance, the brands may be interspersed with the item search results collectively (as illustrated), interspersed with the item search results individually, may appear adjacent (e.g., off to the left, right, top or bottom) of the item search results, or the like.

Figure 5:
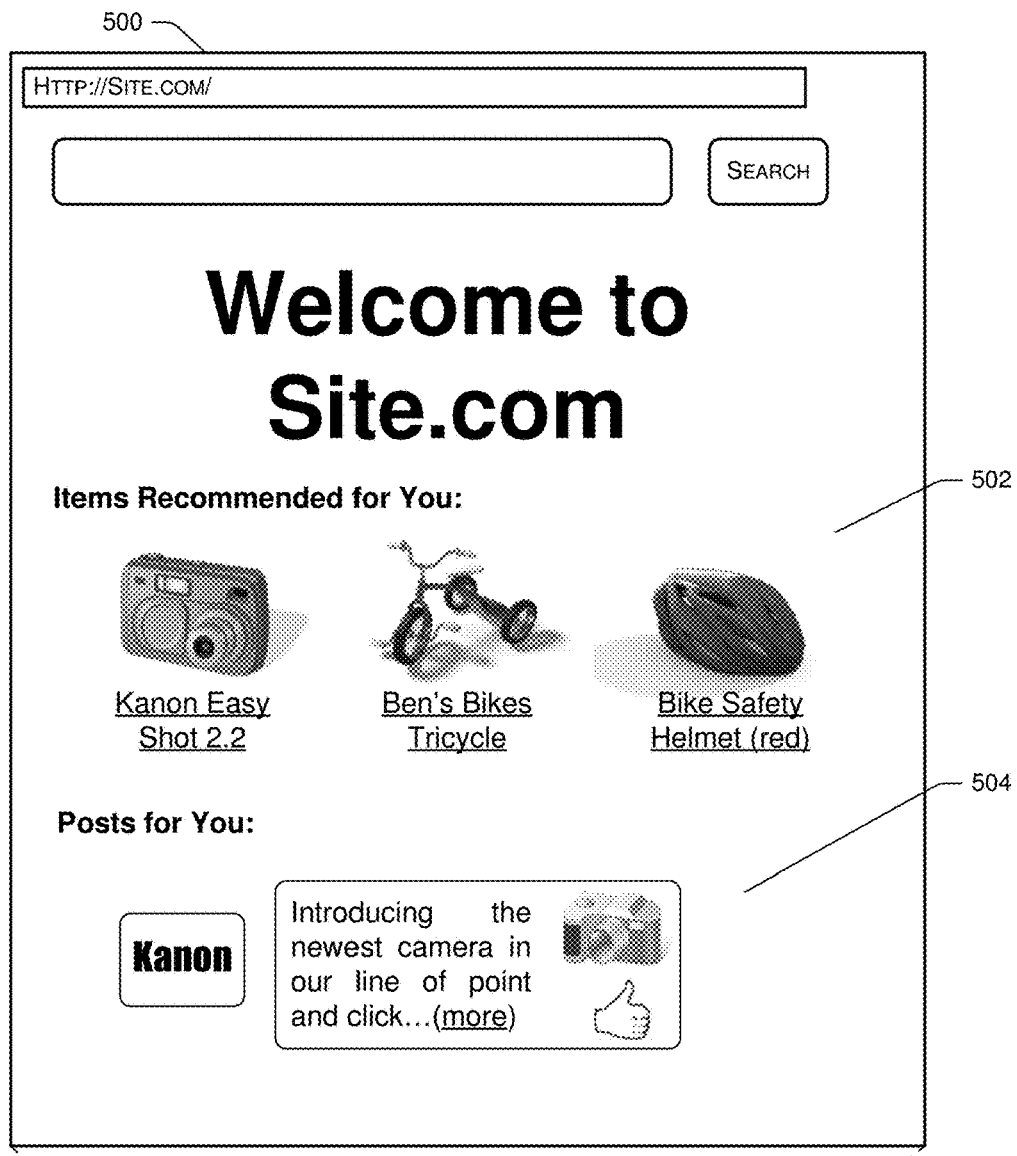

FIG. 5 illustrates a UI 500 that comprises an example home page of an electronic marketplace displaying content from the offering service 106. In this example, the home page may include any sort of content (e.g., recommended items 502) typically found on a home page of a site, such as an electronic marketplace. In addition, however, the UI 500 may include one or more posts 504 provided by representatives of brands that the illustrated user has previously expressed an interest in. In this example, for instance, the user 102(1) has expressed an interest in the brand "Kanon" (e.g., by selecting the icon 302 from the UI 300) and, therefore, the offering service 106 includes a post provided by a representative of Kanon when forming the UI 500 for the computing device 104(1) of the user 102(1). In addition, the UI 500 may include other posts from Kanon and/or other posts from other brands that the user 102(1) has previously expressed an interest in.

The UI 500 may additionally or alternatively include posts from brands that have been deemed similar to the brands that the user has expressed an interest in, or brands that the offering service 106 believes may be of interest to the user 102(1) based on information stored in the user's account. If the user 102(1) has not expressed an interest in any brand, then the UI 500 might not include any posts or may include posts from brands that the offering service 106 determines may be of interest to the user.

Figure 6:
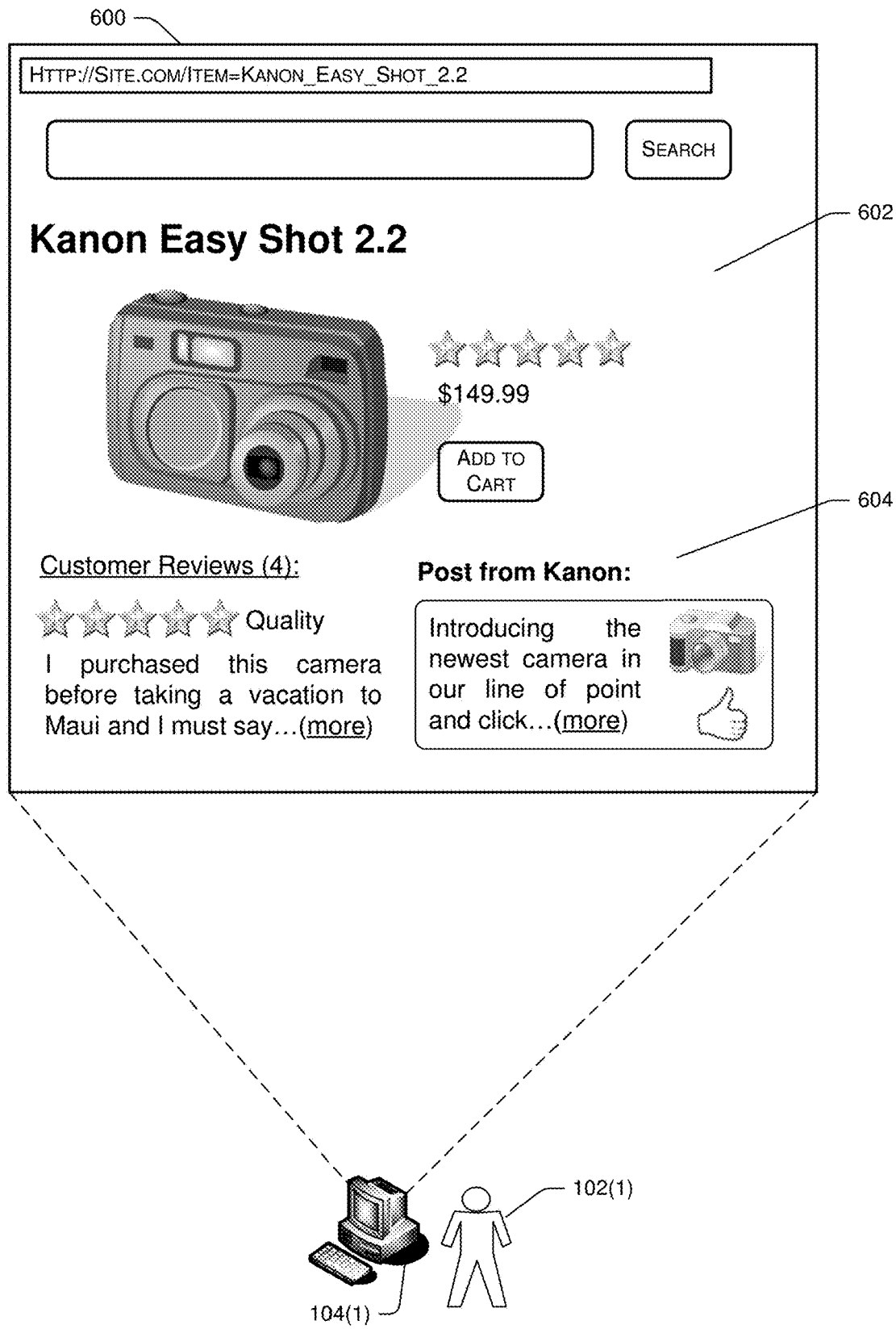
FIG. 6 illustrates an example UI that includes details associated with a particular item in the electronic catalog of the offering service. This example UI also includes a post provided by a representative of a brand associated with the item.

FIG. 6 illustrates an example UI 600 that includes details 602 associated with a particular item in the electronic catalog of the offering service. In this example, the item is a camera that is made by the example brand "Kanon". As such, this UI 600 includes details such as a cost of the camera, a rating of the camera, previous customer reviews of the camera, an icon that is selectable to add the item to the shopping cart of the user 102(1) and the like. In addition, this example UI 600 also includes a post 604 provided by a representative of a brand associated with the item. That is, the detail page of this item made by the brand "Kanon" includes a post from "Kanon". As such, the item detail page represents another location where the offering service 106 may surface posts by this particular brand.

Furthermore, while the UI 600 illustrates a single post, the UI 600 may include additional posts from Kanon or other related brands in other embodiments. Furthermore, the UI 600 may include a link that, when selected, causes the offering service 106 to serve the UI focused on the brand of the illustrated camera. For instance, the offering service 106 may serve the UI 200 or 300 described above.

Example Processes

Figure 7A:
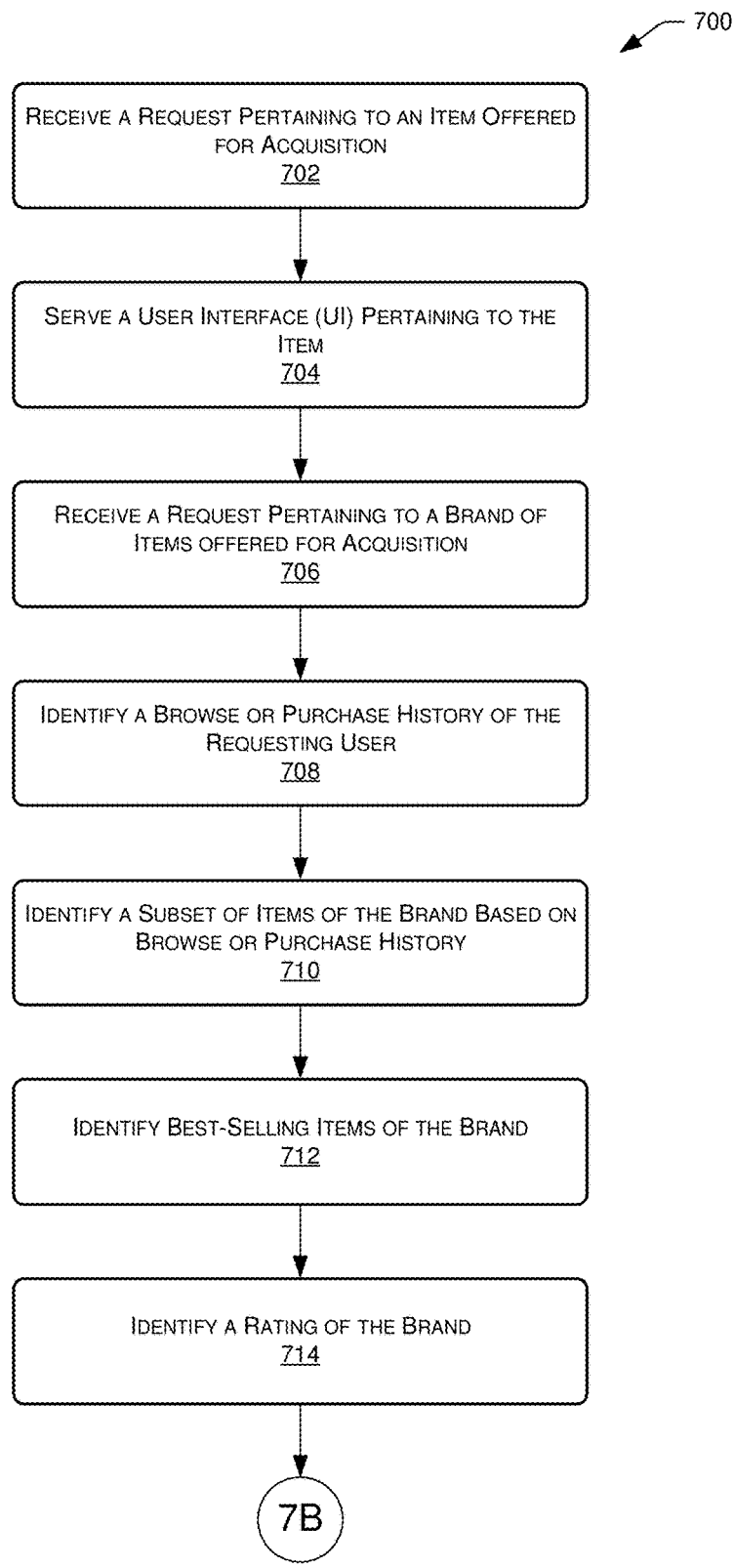
FIGS. 7A-B illustrate an example flow diagram of a process for serving a UI that includes details associated with a particular brand.
Figure 7B:
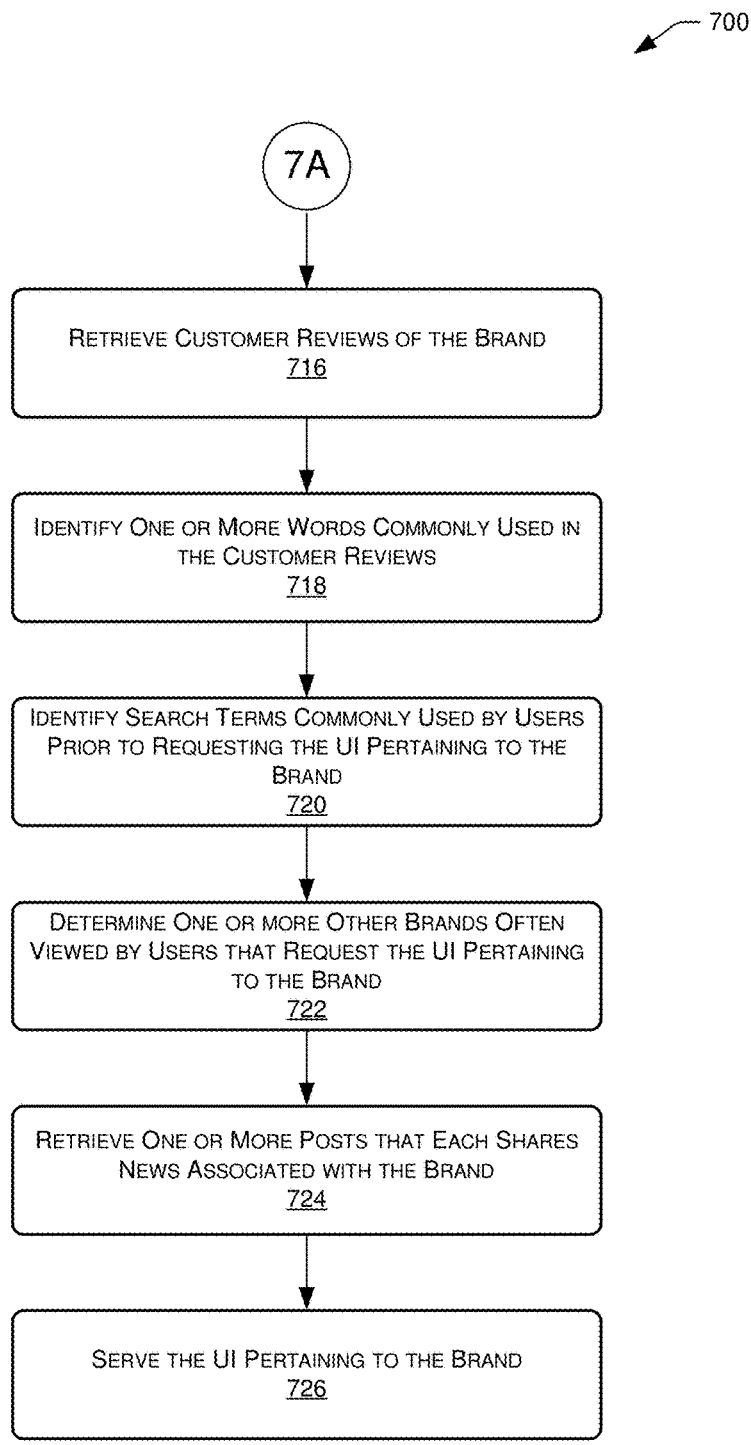
Figure 8:
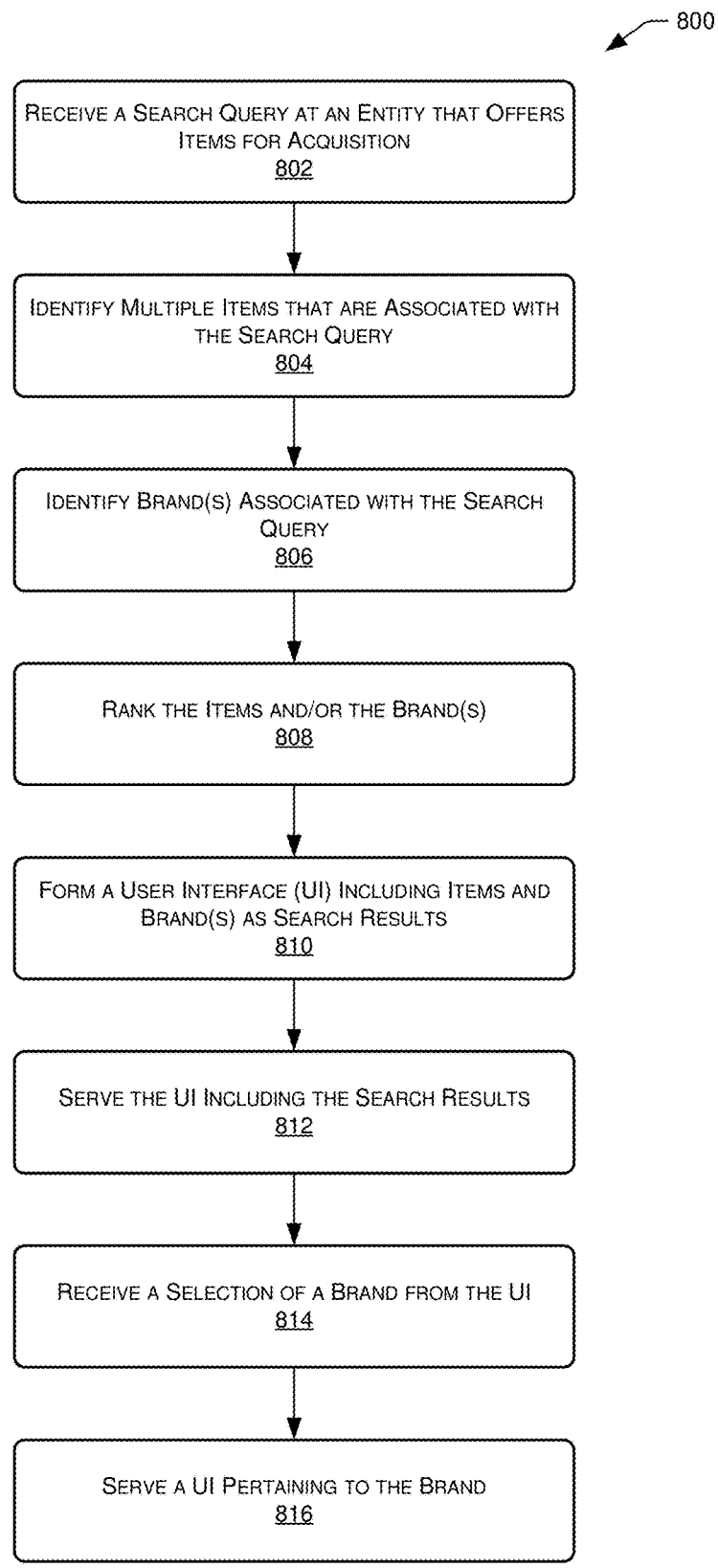
FIG. 8 illustrates an example flow diagram of a process for generating search results that include both individual items offered for acquisition and information associated with particular brands of items.
Figure 9:
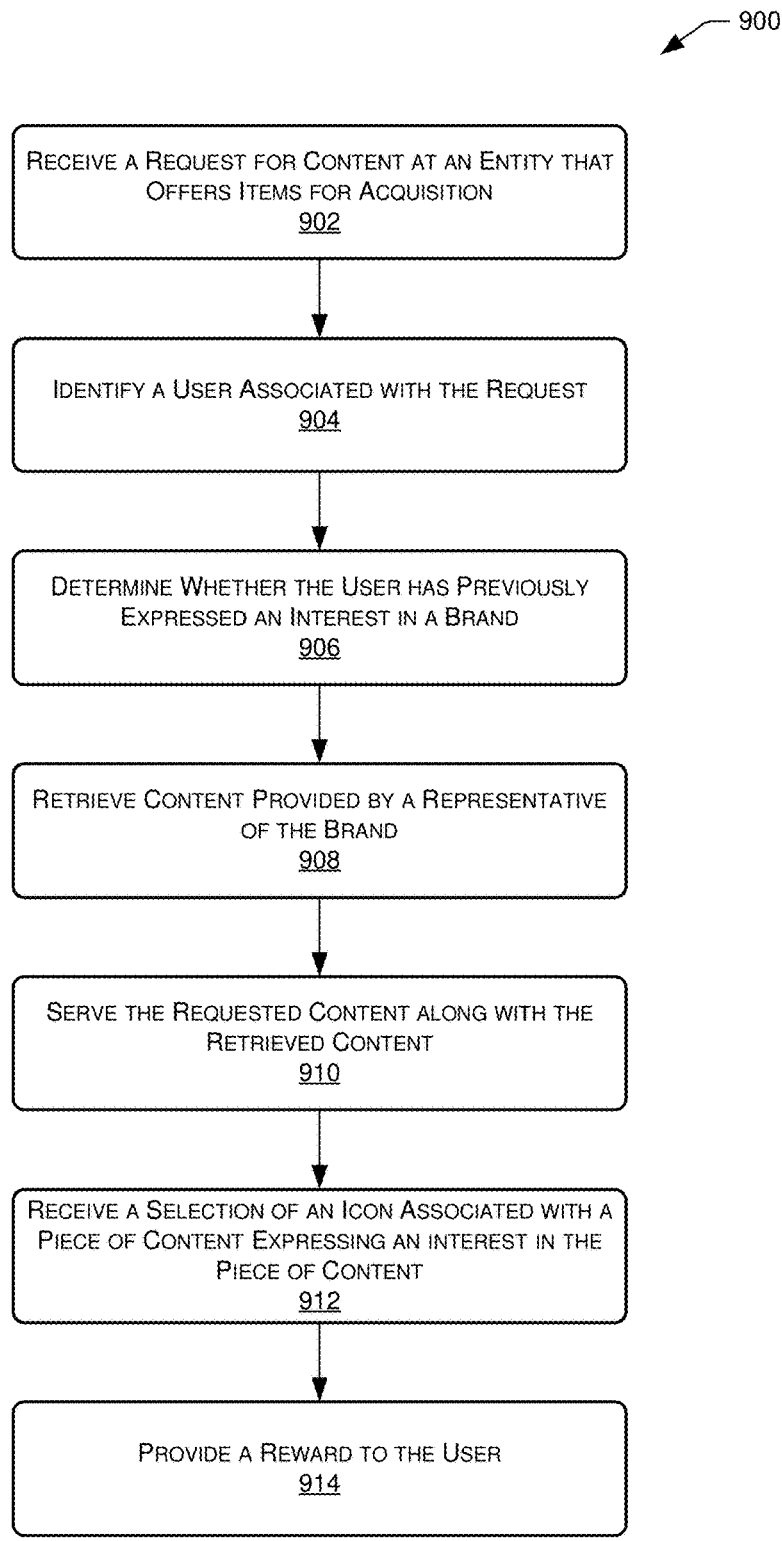
FIG. 9 illustrates an example flow diagram of a process for providing, to a user, content provided by a brand when the user has previously expressed interest in the brand.

FIGS. 7A-B illustrate an example flow diagram of a process 700 for serving a UI that includes details associated with a particular brand. FIG. 8, meanwhile, illustrates an example flow diagram of a process 800 for generating search results that include both individual items offered for acquisition and information associated with particular brands of items. Finally, FIG. 9 illustrates an example flow diagram of a process 900 for providing, to a user, content provided by a brand when the user has previously expressed interest in the brand. In some instances, the offering service 106 discussed above may perform these processes, while in other instances another entity may perform some or each operation of these processes.

These processes are each illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

The process 700 includes, at 702, receiving a request pertaining to an item offered for acquisition. For instance, the offering service 106 may receive a request from a user to view an item detail page associated with the item, customer reviews associated with the item, or any other content associated with a particular item offered by the offering service. At 704, and in response, the process 700 serves a user interface (UI) pertaining to the item, such as an item detail page, or the like.

At 706, the process receives a request pertaining to a brand of an item offered for acquisition. For instance, the offering service 106 may receive a request for a brand-focused web page, such as the web page shown in FIG. 2 or otherwise. At 708, the process 700 may identify a browse or purchase history of the user that provided the request and, at 710, the process 700 may identify a subset of items of the brand based upon this history. For instance, of the 100 digital cameras offered by the brand, the process 700 may identify ten cameras that may be of interest to the user based upon the user's browse history or purchase history. In another instance, items purchased by "friends" may be identified and displayed in an anonymous manner. At 712, the process 700 then identifies the best-selling items of the brand, while the process 700 identifies a rating of the brand at 714. FIG. 7B continues the illustration and includes, at 716, the process 700 retrieving customer reviews of the brand. Next, the process 700 may identify one or more terms commonly used in the customer reviews at 718. At 720, the process then identifies search terms commonly used by users prior to requesting the UI pertaining to the brand. For instance, the process 700 may identify search terms as shown in the area 312 of the UI 300. At 722, the process 700 then determines one or more other brands often viewed by users that request the UI pertaining to the brand. At 724, the process then retrieves one or more posts, each of which shares news associated with the brand, such as the posts described above. Finally, the process 700 may serve the UI pertaining to the brand at 726. The UI may include some or all of the content discussed above.

FIG. 8, meanwhile, illustrates a process 800 for generating search results that include both individual items offered for acquisition and information associated with particular brands of items. At 802, the process 800 receives a search query at an entity that offers items for acquisition. At 804, the process 800 identifies multiple items that are associated with the search query and, at 806, identifies one or more brands that are associated with the search query.

At 808, the process 800 may rank the items and/or the brands, such as according to each item or brand's relevance to the received search query. At 810, the process forms a UI that identifies both items and brands as search results. The search results may be ordered at least partly based on the rankings. At 812, the process 800 serves the UI that includes the search results. At 814, the process 800 may receive a selection of a brand from the served UI. Finally, at 816, the process 800 serves a UI pertaining to the brand, such as the brand-focused UIs discussed with reference to FIGS. 2 and 3.

Finally, FIG. 9 illustrates a process 900 for providing, to a user, content provided by a brand when the user has previously expressed interest in the brand. At 902, the process 900 receives a request for content at an entity that offers items for acquisition. At 904, the process identifies a user associated with the request. At 906, the process determines whether the user has previously expressed an interested in one or more brands, such as by selecting a "like" icon described above. At 908, the process 900 retrieves content provided by a representative of each brand that the user has previously expressed an interest in.

At 910, the process 900 serves the requested content to a computing device of the user along with the retrieved content. In some instances, the retrieved content comprises discrete pieces of content, such as individual posts from one or more brands. At 912, the process 900 receives a selection of an icon associated with one of the pieces of content (e.g., a post), with the selection of the icon indicating the user expressing an interest in the piece of content. For instance, the user may select a "like" icon adjacent to a particular post from a particular brand. In response, the process 900 may provide a reward to the user at 914. The reward may comprise a discount on an item from the brand, a graphical badge displayed on a UI, or any other type of reward having real or perceived value.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. One or more computing devices comprising:
one or more processors; and
memory, coupled to the one or more processors and storing computer-executable instructions that, when executed on the one or more processors, cause the one or more processors to perform acts comprising:
receiving a first request pertaining to an item offered for acquisition and included in an electronic catalog;
serving a first user interface pertaining to the item at least partly in response to receiving the first request;
receiving a second request pertaining to a brand of items offered for acquisition and included in the electronic catalog; and
serving a second user interface pertaining to the brand at least partly in response to receiving the second request, wherein the second user interface includes a banner image that identifies the brand, and wherein the banner image comprises:
representations of a plurality of items associated with the brand; and
an icon, wherein selection of the icon displays a price for acquiring the plurality of items as a bundle.

2. The one or more computing devices of claim 1, wherein selection of the icon further results in addition of the plurality of items to a virtual shopping cart.

3. The one or more computing devices of claim 1, wherein selection of the icon further results in a direct purchase of the plurality of items.

4. The one or more computing devices of claim 1, wherein the banner image further comprises a second icon that, when selected, causes the second user interface to display details associated with one or more items of the plurality of items.

5. The one or more computing devices of claim 1, wherein a representation of an item of the plurality of items comprises an image that depicts the item.

6. The one or more computing devices of claim 1, wherein the banner image comprises one of multiple different banner images, and wherein selection of the icon further results in display of a different banner image of the multiple different banner images.

7. The one or more computing devices of claim 1, wherein the second user interface includes details regarding multiple different items that are associated with the brand and that are offered for acquisition.

8. The one or more computing devices of claim 1, wherein the second user interface includes a second icon that, when selected by a user, indicates approval of the brand by the user.

9. The one or more computing devices of claim 1, wherein the second request is received from a particular user, and the acts further comprise:
   identifying a browse history or a purchase history of the particular user; and
   identifying a subset of items of the plurality of items to recommend to the particular user based at least in part on the browse history or the purchase history,
   wherein the second user interface includes details regarding the subset of items.

10. The one or more computing devices of claim 1, the acts further comprising retrieving customer reviews of the brand, and wherein the second user interface includes the customer reviews.

11. The one or more computing devices of claim 10, the acts further comprising identifying one or more words commonly used in the customer reviews, and wherein the second user interface includes an indication of the one or more words.

12. One or more non-transitory computer-readable media storing computer-executable instructions that, when executed on one or more processors, cause the one or more processors to perform acts comprising:
   receiving, from a client computing device, a search query at an entity that offers items for acquisition;
   identifying multiple items that are offered for acquisition by the entity and that are associated with the search query;
   identifying a brand of items associated with the search query;
   ranking items of the multiple items to generate ranked items at least partly according to a relevance of the items to the search query;
   forming a first user interface comprising search results, the search results including representations of the ranked items and a brand icon associated with the brand, wherein the brand icon is interspersed with the representations of the ranked items and is selectable to present an indication of the brand;
   serving the first user interface to the client computing device;
   receiving an indication of the brand from the client computing device; and
   serving, to the client computing device, a second user interface pertaining to the brand at least partly in response to receiving the indication, wherein first contents of the second user interface are based at least in part upon second contents of the search query, and wherein the second user interface includes a banner image that identifies the brand and that comprises:
   representations of a plurality of items associated with the brand; and
   an icon, wherein selection of the icon displays a price for acquiring the plurality of items as a bundle.

13. The one or more non-transitory computer-readable media of claim 12, wherein selection of the icon further results in addition of the plurality of items to a virtual shopping cart.

14. The one or more non-transitory computer-readable media of claim 12, wherein the banner image further comprises a second icon selectable to initiate playback of a media item associated with the brand, wherein the playback occurs within a new window superimposed on the second user interface or occurs on a second client computing device.

15. The one or more non-transitory computer-readable media of claim 12, wherein the banner image further comprises a second icon that, when selected, causes the second user interface to display details associated with one or more items of the plurality of items.

16. The one or more non-transitory computer-readable media of claim 12, wherein the second user interface includes a second icon that, when selected by a user, indicates approval of the brand by the user.

17. The one or more non-transitory computer-readable media of claim 12, wherein the second request is received from a particular user, and the acts further comprise:
   identifying a browse history or a purchase history of the particular user; and
   identifying a subset of items of the plurality of items to recommend to the particular user based at least in part on the browse history or the purchase history,
   wherein the second user interface includes details regarding the subset of items.

18. A method comprising:
   under control of one or more computing systems configured with executable instructions,
   receiving, at an entity that offers items for acquisition, a request for first content;
   identifying a user associated with the request;
   determining, based at least in part on user preference information associated with the user, whether the user has previously expressed an interest in a brand of items;
   at least partly in response to determining that the user has expressed an interest in the brand, retrieving second content associated with the brand; and
   serving the first content along with the second content, wherein serving the first content along with the second content includes serving a user interface including a banner image that identifies the brand and that comprises:
   representations of a plurality of items associated with the brand; and
   an icon, wherein selection of the icon displays a price for acquiring the plurality of items as a bundle.

19. The method of claim 18, wherein the banner image further comprises a second icon that, when selected, causes the user interface to display details associated with one or more items of the plurality of items.

20. The method of claim 18, further comprising:
   identifying a browse history or a purchase history of the user; and identifying a subset of items of the plurality of items to recommend to the user based at least in part on the browse history or the purchase history of the user,
wherein the user interface includes details regarding the subset of items.

\* \* \* \* \*